United States Patent [19]

Witt et al.

[11] Patent Number: 5,064,177

[45] Date of Patent: Nov. 12, 1991

[54] POWER CLAMP WITH ENCLOSED TRACK

[75] Inventors: Larry M. Witt, Rochester; Bruce K. Sherman, Lapeer, both of Mich.

[73] Assignee: Delaware Capital Formation, Wilmington, Del.

[21] Appl. No.: 620,436

[22] Filed: Dec. 3, 1990

Related U.S. Application Data

[63] Continuation-in-part of Ser. No. 465,395, Jan. 16, 1990, abandoned.

[51] Int. Cl.[5] .............................................. B23Q 3/08

[52] U.S. Cl. ........................................ 269/32; 269/27; 269/228

[58] Field of Search ..................... 269/24, 27, 32, 228, 269/239, 35

[56] References Cited

U.S. PATENT DOCUMENTS

| | | | |
|---|---|---|---|
| 4,396,183 | 8/1983 | Lymburner | 269/32 |
| 4,458,889 | 7/1984 | McPherson et al. | 269/32 |

*Primary Examiner*—J. J. Hartman

*Attorney, Agent, or Firm*—Lloyd M. Forster

[57] ABSTRACT

A power clamp having linear bearing tracks for actuating toggle linkage characterized by a combination of fixed and moving cover elements completely enclosing the bearing tracks to prevent intrusion of foreign materials.

21 Claims, 6 Drawing Sheets

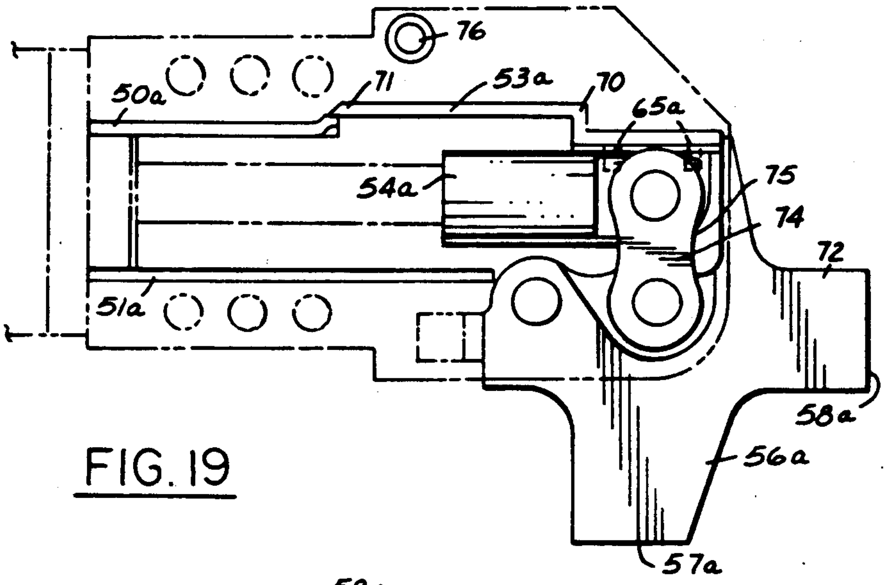
FIG. 19
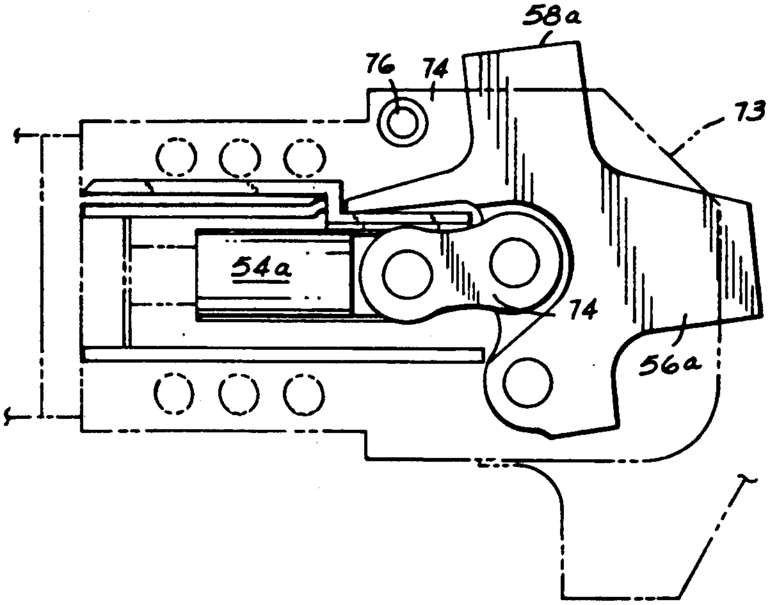
FIG. 20
FIG. 21
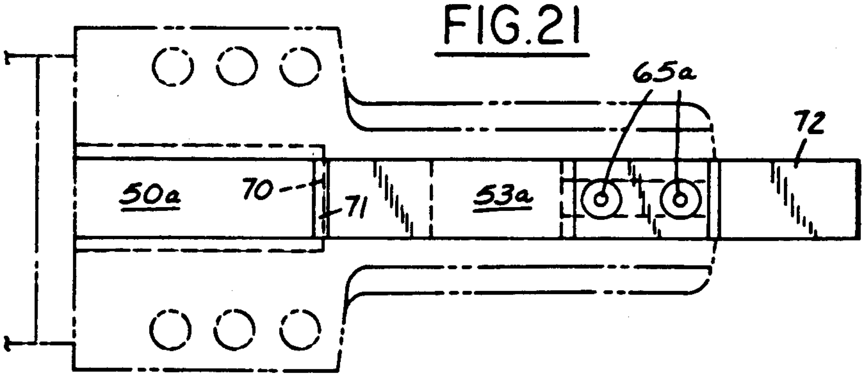

POWER CLAMP WITH ENCLOSED TRACK

This application is a continuation-in-part of copending application, Ser. No. 07,465,395, filed on Jan. 16, 1990, now abandoned.

BACKGROUND OF THE INVENTION

Prior U.S. Pat. No. 4,458,889 issued on July 10, 1984 discloses a locking power clamp wherein highly pressurized needle bearings in straight reaction guide track portions of the clamp located in assembled body sides actuate links connected to a pivoted clamp arm. Attempts have been made to cover the track area with tape as disclosed in said Patent, or with flexible boots, or with wipers to prevent build-up in the track, as disclosed in copending application Ser. No. 237,441 filed on Aug. 29, 1988.

BRIEF SUMMARY OF THE PRESENT INVENTION

The present application discloses a further development in protecting the tracks against intrusion of dust or other foreign substance which might otherwise land on the guide tracks for pickup by the rolling bearings. In this case, total enclosure of the tracks has been effected by a combination of stationary and moving plates, the clamp arm providing end closure and other covering surfaces of rigid clamp elements; also by an alternative single piece body construction integrally enclosing the tracks.

BRIEF DESCRIPTION OF THE DRAWINGS

FIG. 19 is a view similar to FIG. 3 illustrating a modified embodiment in clamping position;

FIG. 20 is a view similar to FIG. 19 showing the clamp arm in open position;

FIG. 21 is a plan view of the FIG. 19 embodiment;

DETAILED DESCRIPTION OF FIRST EMBODIMENT

Figure 1:
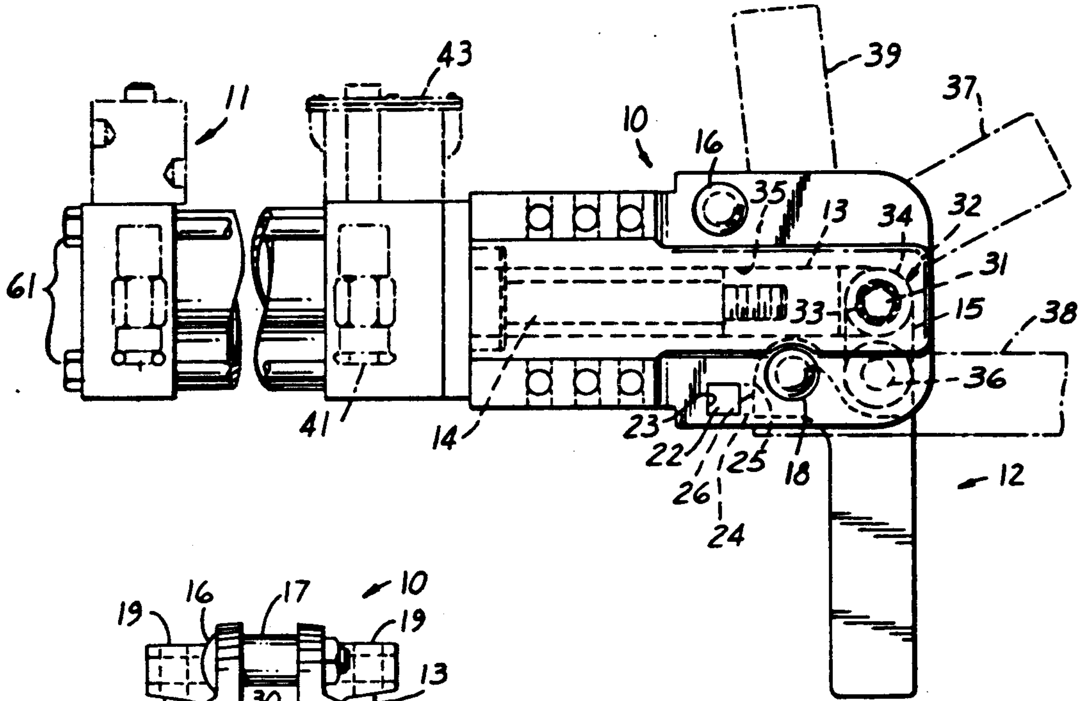
(PRIOR ART) FIG. 1
FIG. 1 is a side elevation of the prior art clamp disclosed in U.S. Pat. 4,458,889.
Figure 2:
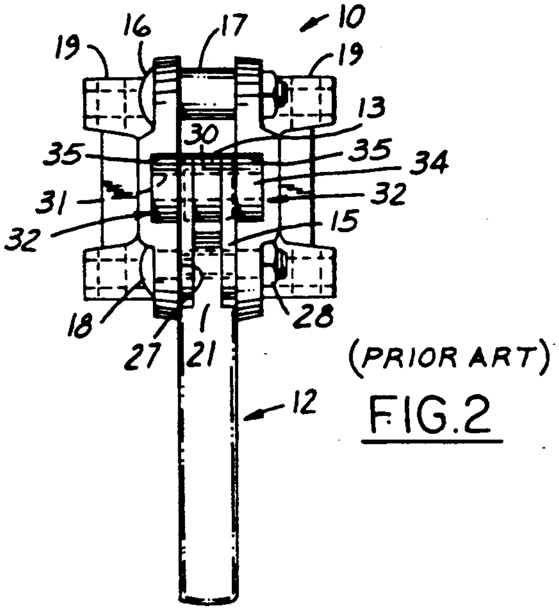
(PRIOR ART) FIG. 2
FIG. 2 is a an end elevation of the clamp shown in FIG. 1.

With reference to FIGS. 1 and 2, the power clamp of the prior art, U.S. Pat. No. 4,458,889 comprises clamp head 10 actuated by power cylinder 11 adapted to move 90° clamp arm 12 through coupling 13, piston rod 14 and links 15 to the clamping position shown in full line relative to any base or work table to which the clamp head may be secured through any of the unnumbered multiple cross bolt holes illustrated in FIGS. 1 and 2. Clamp head 10 comprises two symmerical body forging halves 19 connected by bolt 16 with spacer 17 and by bolt 18 passing through clamp arm 12. Square cross pin 22 seated in square recesses 23 in their respective body halves is provided with a stop shoulder 24 which serves as a spacer for the lower body halves as well as providing a stop surface 25 for abutting clamp arm surface 26 in clamping position. Nut 28 is staked at a tightened position against the shoulders of cross pin 22 which is dimensioned to provide free pivotal movement of links 15 and clamp arm 12 between guide surfaces 27 provided by the inner surfaces of the body halves. A spacer bushing, not shown, for bolt 18 also assures proper clearance.

Linkage for actuating clamp arm 12 through piston rod 14 includes coupling 13 having reduced end 30 extending between links 15 connected thereto by shaft 31, forming the inner race for spaced needle bearings 32, each having needles 33 and outer track follower race 34 engaging longitudinal slot track 35 in each of the forged halves 19 of clamp head 10. In order to achieve positive locking of the clamp arm, needle bearings 32 pass slightly overcenter (beyond right angle relation with pivot pin 36) relative to reaction guide track surfaces 35.

It will be seen that retraction of piston rod 14 from the locked condition of the clamp arm 12, shown in full line, will pull bearings 32 and the upper ends of links 15 through center to a release condition and cause arm 12 to pivot about bolt 18 through a maximum arc of 119° to a position shown by dotted line 37. In the case of an optional 180° arm such as shown by dotted line position 38 in its clamping position, retraction through a 96° maximum arc will move the arm to dotted line position 39.

Figure 3:
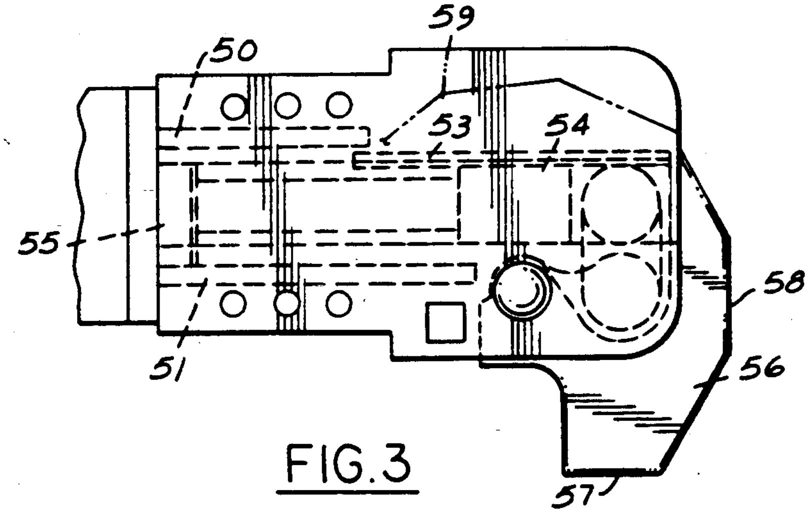
FIG. 3 is a schematic view similar to FIG. 1 with modifications for effecting complete enclosure of the guide tracks.
Figure 4:
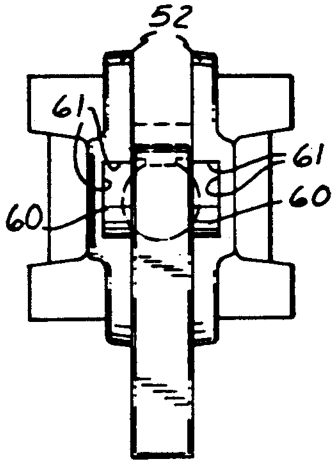
FIG. 4 is an end elevation of the clamp shown in FIG. 3.
Figure 5:
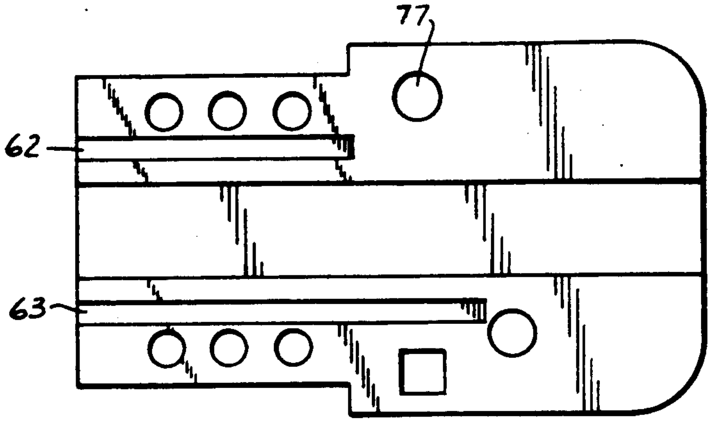
FIG. 5 is a side elevation of one half of the two-piece clamp body.
Figure 6:
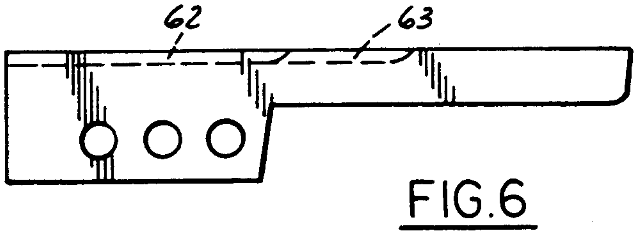
FIG. 6 is a plan view of the body shown in FIG. 5.
Figure 12:
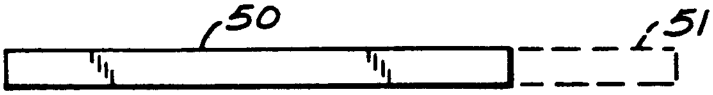
FIG. 12 is a side edge view of similar side plates shown in FIG. 3 having two different lengths.
Figure 13:
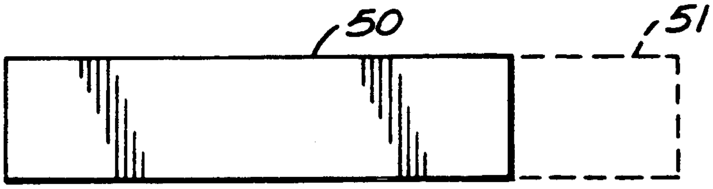
FIG. 13 is a plan view of the side plate shown in FIG. 12.
Figure 16:
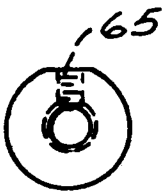
FIG. 16 is an end view of the clevis shown in FIG. 14.
Figure 14:
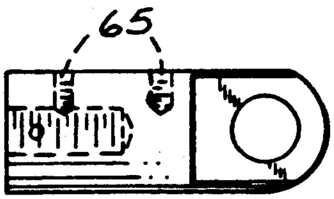
FIG. 14 is a side elevation of a clevis shown in FIG. 3.
Figure 15:
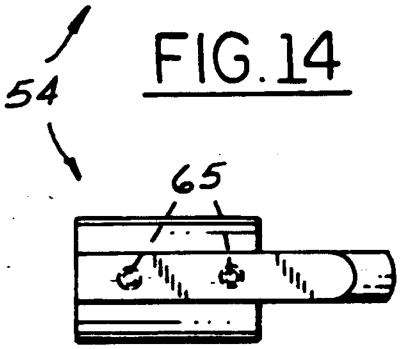
FIG. 15 is a plan view of the clevis shown in FIG. 14.

With reference to FIGS. 3 and 4, the enclosure modification of the present invention involves total enclosure of rectangular reaction guide tracks 61 by upper cover plate 50 and lower cover plate 51 illustrated per se in FIGS. 12 and 13, extending to engage slots 62 and 63, shown in FIGS. 5 and 6, in fixed relation between body sides 52; clevis plate 53 attached to clevis 54 as hereafter shown, together with ring 55, and arm 56 optionally constructed for a vertical arm extension to be welded at surface 57 or horizontal arm extension to be welded at surface 58, serving in either case in combination to fill the space between body sides 52 at the forward end of the clamp in either the clamping position shown in full line or in retracted position shown in dotted line at 59, as well as all intermediate positions.

Optional plugs 60 may be welded to the body sides at the ends of rectangular reaction guide tracks 61 to close the otherwise end openings of such tracks against intrusion of foreign substance.

With reference to FIGS. 5 and 6, provision for retention of cover plates 50 and 51 is made by engaging slots 62 and 63 respectively with body sides 52 bolted together as by bolts 16 and 18 shown in FIGS. 1 and 2. With additional reference to FIGS. 9–11 and 14–16, clevis plate 53 is attached to clevis 54 by a pair of flat head screws, not shown, extending through passages 64 into threaded holes 65. It will be seen that clevis plate 53 serves in telescoping combination with cover plate 50 to maintain a top enclosure for guide tracks 61 for all positions of clamp arm 56 while the proximity of arm 56 arcuate forging surface **66*x* identified in FIG. 7 and 20 to lower plate 51*x*, shown in FIG. 3, likewise maintains a lower enclosure throughout all positions of clamp arm 56. Under extreme conditions, supplemental seals can readily be provided at clearance openings between the end of lower plate 51 and forging surface 66 as well as between upper cover plate 50 and telescoping clevis plate 53**.

DETAILED DESCRIPTION OF SECOND EMBODIMENT

With reference to FIG. 19, clevis plate **53*a* of the second embodiment is provided with step 70 to raise the level of clevis plate 53*a* above fixed cover plate 50*a*, which has been lowered somewhat accordingly relative to cover plate 50 of the first embodiment, to accommodate the telescoping overtravel, and offset at 50*b* for engagement by end 71 of clevis plate 53*a* which provides clearance between adjacent telescoping surfaces for any dust or other foreign substance which might accumulate on top of plate 50*a* and thereby avoid abrasive wear from reciprocation of clevis plate 53*a*. Relative to clevis 54 illustrated in FIGS. 14 and 15, clevis 54*a* has been modified to accommodate attachment screw holes 65*a* at the forward end of clevis 54*a***.

Figure 7:
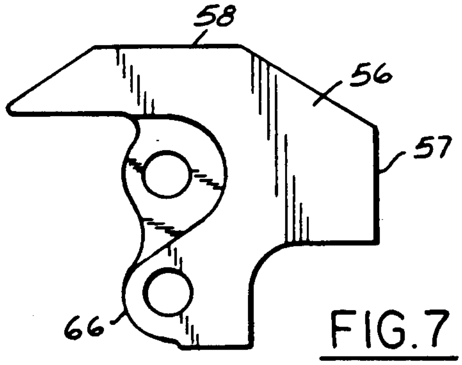
FIG. 7 is a side elevation of the clamp jaw shown in FIG. 3.
Figure 9:
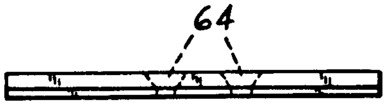
FIG. 9 is a side elevation of a clevis plate shown in FIG. 3.
Figure 11:
FIG. 11 is an end view of the clevis plate shown in FIG. 9.
Figure 10:
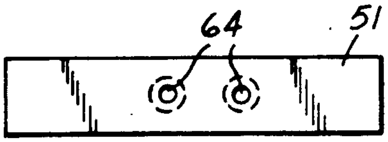
FIG. 10 is a plan view of the clevis plate shown in FIG. 9.

Clamp arm **56*a* has been modified, relative to arm 56 illustrated in FIGS. 3 and 7, by adding an extension 72 for weld surface 58*a* which, together with bevel relief 73 at the upper end of the body side plates 74, provides clearance for the weld connection at 58*a* in all positions of travel, as provided also in the case of weld surface 57*a*. Links 75 have been scalloped at 75*a* to provide additional clearance relative to the end of clevis plate 53*a* as best shown in FIG. 20 and spacer 76 has been moved, from the position indicated at hole 77 in FIG. 5, to provide additional clearance for the open position of arm 56*a***.

Figure 22:
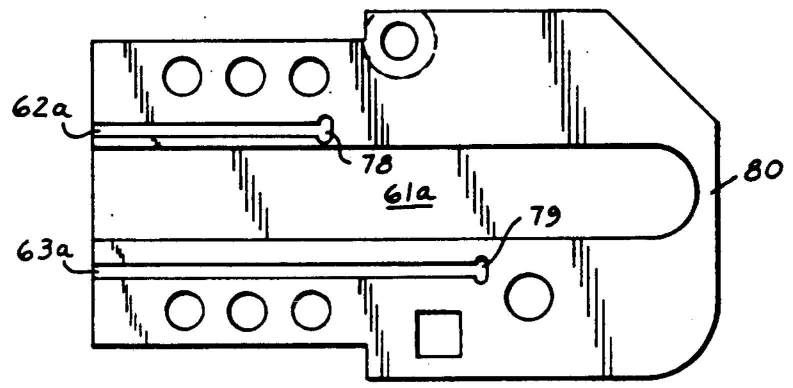
Fig. 22 is a side elevation similar to FIG. 5 illustrating modifications of the preferred embodiment.
Figure 24:
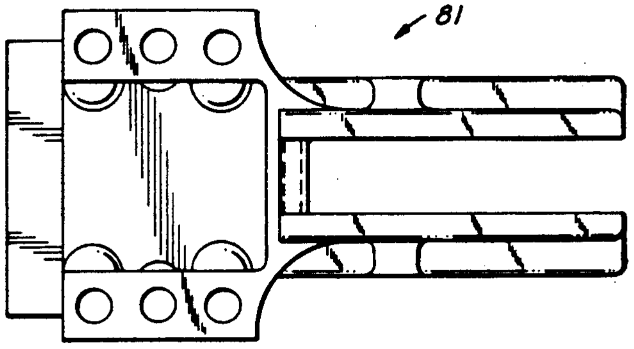
FIG. 24 is a plan view of the body shown in FIG. 23.
Figure 25:
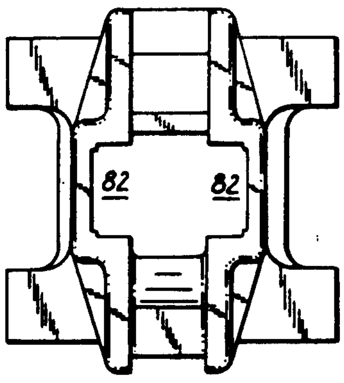
FIG. 25 is an end elevation of the body shown in FIG. 23.
Figure 23:
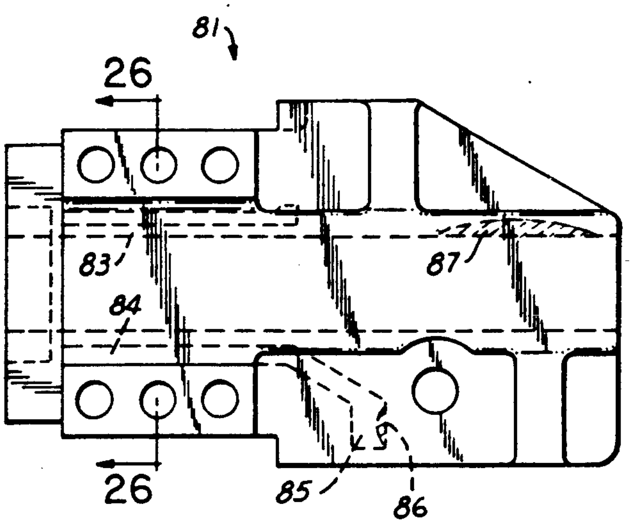
FIG. 23 is a side elevation of a third embodiment, one piece clamp body, made as an investment casting.
Figure 26:
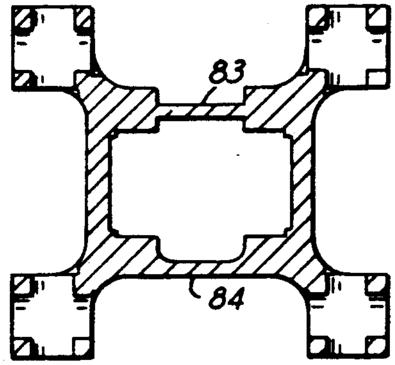
FIG. 26 is a sectional view taken along the line 26—26 of FIG. 23.

With reference to FIG. 22, ends 78 and 79 of slots **62*a* and 63*a* are milled to provide a flat surface normal to the plane of the figure for abutment by ends of cover plates 50*a* and 51*a*, as distinguished from the curved ends for such slots illustrated in FIG. 6 of the first embodiment. Integral ends 80 for reaction guide tracks 61*a* are provided as a further modification relative to the open ends illustrated in FIG. 5 or optional welded plugs 60 as shown in FIG. 4**.

DETAILED DESCRIPTION OF THIRD EMBODIMENT

With reference to FIGS. 23–26, a third embodiment is provided with an integral single piece base 81 including both sides of the body guide tracks 82 with integral upper bridge 83 and lower bridge 84 providing track enclosure in place of cover plates 50, 51, **50*a* and 51*a* of the first two embodiments. Downward projection 85 of lower bridge 84 serves as a positive stop for the clamp arm, not shown, such as 57*a* in FIG. 19. An induction hardened area 86 is provided for impact and wear resistance and a larger induction hardened area 87 is provided at the top of guide tracks 82** for added resistance to reaction of track rollers.

Since through broaching is involved in providing guide tracks 82, end plugs may be added to each of the tracks, forming an end closure similar to 80 in FIG. 22, to cooperate with an arm such as shown the first two embodiments for fully enclosing the arm end of the tracks.

Figure 27:
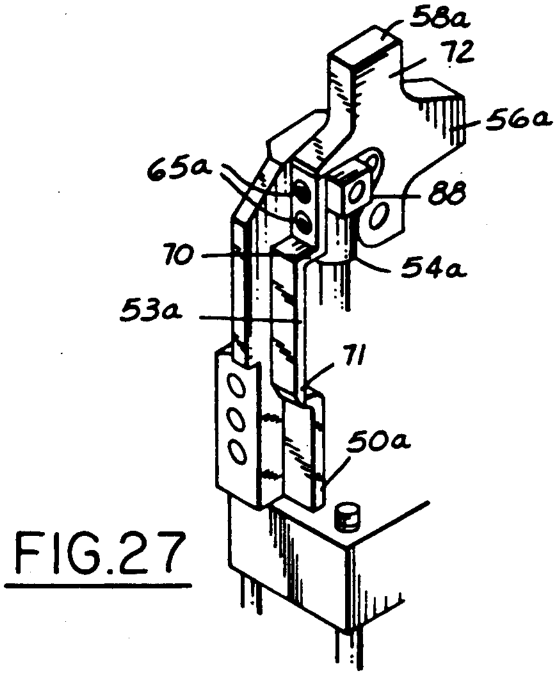
FIG. 27 is a schematic perspective view of a further embodiment.

With reference to FIG. 27, a further modification of the second embodiment substitutes square bronze blocks 88 for anti-friction rollers to provide greater track bearing reaction area in place of roller line contact for highly loaded clamp arms, at the expense of some loss of final mechanical advantage in locking the clamp arm with the pivots on center or slightly overcenter. It is desirable with blocks 88 to limit the travel in closing the clamp arm linkage to stop short of center sufficiently to accommodate retraction with the same cylinder pressure as employed in reaching final clamping position, notwithstanding a reduced piston area for effective pressure.

SUMMARY OF THE TRACK ENCLOSURE

Prior art guide tracks 35 for needle bearings 32, as shown in FIGS. 1 and 2, are open to the intrusion of dust or other foreign substance due to separation of the two forging halves with open space above and below tracks 35. In accordance with the present invention, upper cover plate 50 and lower cover plate 51, illustrated per se in FIGS. 12 and 13 and assembled in FIG. 3, extend between the body side halves 52, shown in FIG. 4, and into slots 62 and 63 shown in FIG. 5, thereby partially enclosing the guide tracks 61, FIG. 4, from foreign substance access, either above or below. Completion of enclosure against upper access is provided by clevis plate 53, illustrated per se in FIGS. 9 and 10 and assembled in FIG. 3, which is attached to clevis 54, illustrated per se in FIGS. 14–16, by a pair of flat head screws extending through passages 64 into threaded holes 65 in a manner similar to assembled screws **65*a* illustrated in FIGS. 21 and 27 for alternative clevis plate 53*a***.

Figure 8:
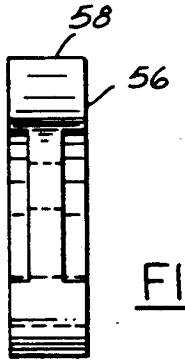
FIG. 8 is a plan view of the clamp jaw shown in FIG. 7.
Figure 17:
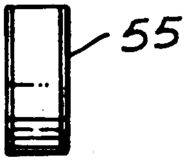
FIG. 17 is a side elevation of a ring shown in FIG. 3.
Figure 18:
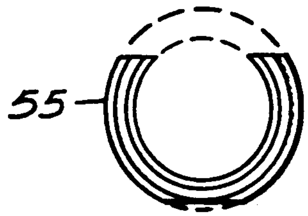
FIG. 18 is an end view of the ring shown in FIG. 17

Enclosure at the back end of the guide tracks is provided by ring 55, illustrated per se in FIGS. 17 and 18 and assembled in FIG. 3, for the piston rod corresponding to piston rod 14 in FIG. 1. The guide tracks are enclosed at the front end by clevis 54, illustrated per se in FIGS. 14–16, and arm 56, illustrated per se in FIG. 7 and 8, respectively shown assembled in FIG. 3. Arm 56 is provided with extension attachment surfaces 57 and 58 for optional welding of a vertical arm extension at 57 or horizontal arm extension at 58. Such attachment surfaces are shown in retracted position by phantom line 59 in FIG. 3. The combination of clevis plate 53, clevis 54 and arm 56 provide a closure against foreign substance access to the guide tracks at the front end of the clamp, which may be augmented at the extreme end by plugs 60, shown in FIG. 4, serving as an alternative to the preferred integral track end closure 80 for guide tracks 61*a* illustrated in FIG. 22. It will be understood that cover plates 50, 51 are retained in slots 62, 63 by assembly of side halves 52, as by bolt 16 with spacer 17 and bolt 18 passing through clamp arm 12, shown in FIGS. 1 and 2.

It will also be understood that clevis plate 53 extending under cover plate 50 as shown in FIG. 3, or alternatively clevis plate 53*a* extending over cover plate 50*a* as illustrated in FIGS. 19 and 20, will serve to maintain the top enclosure throughout the travel of clamp arm 56 or 56*a* between clamping and retracted positions; also that the proximity of clamp arm arcuate surface 66 to the lower cover 51*a*, shown in FIGS. 19 and 7 will maintain a lower enclosure throughout the pivotal articulation of the clamp arm. Any supplemental seals at the clearance opening between such relatively moving surfaces, will simply serve to take up or reduce clearance between the relatively moving metal parts. Alternatively, clevis plate, 53, as illustrated in FIG. 3 to pass under cover plate 50 during opening of clamp arm 56 may be modified, as illustrated in FIGS. 19 and 20, with a clevis plate 53*a* adapted to pass over cover plate 50*a* through a step elevation of clevis plate 53*a* shown at 70. The slots for accommodating upper cover plate 50 or 50*a* may be differently positioned to accommodate the underpassing of clevis plate 53, as in the case of the FIG. 3 embodiment or overpassing of clevis plate 53*a*, as in the FIG. 19 embodiment.

We claim:

1. Power clamp comprising clamp base provided with a pair of laterally spaced longitudinally extending guide tracks having opposed facing sides open, track follower means engaging said guide tracks, clamp arm means pivotally connected to said base intermediate said guide tracks, actuating linkage having spaced pivots, said pivots respectively confined to said guide tracks by connection to said track follower means and having an actuating connection with said clamp arm means, coupling means (54, 54*a*) connected to a reciprocable power source said coupling means having connection means for moving said track follower means said coupling means cooperating with said linkage to provide pivotal movement of said clamp arm means to respective clamp and release positions, characterized by complete enclosure means for said guide tracks, said enclosure means comprising a combination of fixed track cover means connected to said base and movable track cover means connected to said track follower means together with said clamp arm means such that when said reciprocating power source extends said coupling means said connection means moves said track follower means and thus said movable track cover means into place to create said complete enclosure means.

2. Power clamp of claim 1 said fixed cover means comprising a pair of fixed covers extending across the lateral space between said two guide tracks adjacent their opposite extremities.

3. Power clamp of claim 1 wherein said base is constructed with two halves secured in spaced parallel facing relation, each containing one of said guide tracks, said fixed cover means comprising a pair of fixed covers extending between said two spaced halves adjacent the extremities of said guide tracks.

4. Power clamp of claim 1 wherein said guide tracks are provided in an integral single piece clamp base, said base having a pair of bridges adjacent said guide tracks serving as said fixed track cover means.

5. Power clamp of claim 4 wherein one of said bridges includes an extension stop (85, FIG. 23) for said clamp arm means.

6. Power clamp of claim 5 wherein said base is constructed as a casting with a longitudinal passage having broached guide tracks.

7. Power clamp of claim 1, said track follower means comprising a pair of rectangular blocks, each with linear surfaces for engaging one of said guide tracks with close perimeter clearance relation.

8. Power clamp of claim 3 including slots in said respective base halves engaged by edges of said fixed covers.

9. Power clamp of claim 3 including a single movable cover (53, FIG. 3; 53*a*, FIG. 19) having in an overlapping relationship with one of said fixed covers (50, FIG. 3; 50*a*, FIG. 19) extending in close proximity between said two base halves such that said movable cover means and said one fixed cover have a telescoping relationship during reciprocation of said power source.

10. Power clamp of claim 9 wherein said movable cover is attached to said coupling means for conjoint reciprocation therewith.

11. Power clamp of claim 10 wherein said clamp arm means includes an arcuate surface concentric with its pivot center in close proximity to one end of the other of said fixed covers to effect a substantial closure therebetween throughout the pivotal movement of said clamp arm.

12. Power clamp of claim 11 wherein said clamp arm means includes a body substantially filling the space between said base halves at one end of said tracks.

13. Power clamp of claim 12 wherein said clamp arm means includes a projection substantially filling the space between said base halves left by said movable cover upon its retraction to clamp release position.

14. Power clamp comprising clamp base provided with guide track means, said base being constructed with two halves secured in spaced parallel opposed facing relation, each half having a straight rectangular cross section guide track with its opposed facing sides open extending to an end of each base half, track follower means engaging said guide track means, clamp arm means pivotally connected between said base halves, actuating linkage means having spaced pivots, said pivots respectively confined to said guide tracks means by connection to said track follower means and having an actuating connection with said clamp arm means, coupling means (54, 54*a*) connected to a reciprocable power source. Said coupling means having actuating connection means for moving said track follower means along said track means said coupling means cooperating with said linkage means to provide pivotal movement of said clamp arm means to respective clamp and release positions, characterized by complete enclosure means for said guide track and track follower means, said enclosure means comprising a combination of fixed cover means connected to said base and movable cover means connected to said track follower means together with said clamp arm means such that when said reciprocating power source extends said coupling means. Said connection means moves said track follower means and thus said movable track cover means into place to create said complete enclosure means.

15. Power clamp of claim 14 wherein said fixed cover means comprising a pair of fixed covers extending between said two spaced halves adjacent opposite extremities of said guide tracks.

16. Power clamp of claim 15 including slots in said respective base halves engaged by the edges of said fixed covers, each of said slots terminating at one end with a perpendicular abutment wall.

17. Power clamp of claim 14 wherein each of said guide tracks terminates at one end with an integral end wall.

18. Power clamp of claim 14 wherein each of said guide tracks terminates at one end with an integral semi-circular end wall.

19. Power clamp of claim 15 including a single movable cover (53, FIG. 3; 53*a*, FIG. 19) lying in an overlapping relationship with one of said fixed covers (50, FIG. 3; 50*a*, FIG. 19) extending in close overriding proximity between said two base halves such that said movable cover means and said one fixed cover have a telescoping relationship during reciprocation of said power source.

20. Power clamp of claim 19 wherein said movable cover is attached to said coupling means for conjoint reciprocation therewith.

21. Power clamp of claim 14 wherein said clamp arm includes a pair of right angle related projections, each having an end surface for welding an optional further extending clamp arm, the welded surfaces of said projections extending beyond the extremities of said base halves throughout opening enclosing travel of said clamp arm.

* * * * *